United States Patent
Crawford et al.

(10) Patent No.: US 8,700,479 B2
(45) Date of Patent: Apr. 15, 2014

(54) WIRELESS NETWORK ACCESS PREPAYMENT SYSTEMS AND METHODS

(75) Inventors: Erik S. Crawford, Parker, CO (US); Thomas B. Sayor, Castle Rock, CO (US); Kenneth Algiene, Littleton, CO (US)

(73) Assignee: The Western Union Company, Englewood, CO (US)

( * ) Notice: Subject to any disclaimer, the term of this patent is extended or adjusted under 35 U.S.C. 154(b) by 391 days.

(21) Appl. No.: 13/033,368

(22) Filed: Feb. 23, 2011

(65) Prior Publication Data
US 2011/0145079 A1  Jun. 16, 2011

Related U.S. Application Data

(62) Division of application No. 10/953,863, filed on Sep. 28, 2004, now Pat. No. 7,917,395.

(51) Int. Cl.
*G06Q 30/00* (2012.01)

(52) U.S. Cl.
USPC ........................................ 705/26.1; 705/27.1

(58) Field of Classification Search
USPC .............................................. 705/26.1, 27.1
See application file for complete search history.

(56) References Cited

U.S. PATENT DOCUMENTS

| | | |
|---|---|---|
| 5,179,585 A | 1/1993 | MacMillan, Jr. et al. |
| 5,918,909 A | 7/1999 | Fiala et al. |
| 6,547,132 B1 | 4/2003 | Templeton et al. |
| 6,601,040 B1 * | 7/2003 | Kolls .......................... 705/14.23 |
| 6,745,022 B2 | 6/2004 | Knox |
| 6,829,596 B1 | 12/2004 | Frazee |
| 7,324,641 B2 | 1/2008 | McGee et al. |
| 2002/0088851 A1 | 7/2002 | Hodes |
| 2002/0091573 A1 | 7/2002 | Hodes |
| 2002/0153414 A1 | 10/2002 | Stoutenburg et al. |
| 2002/0169719 A1 | 11/2002 | Dively et al. |
| 2004/0139318 A1 | 7/2004 | Fiala et al. |

OTHER PUBLICATIONS

Special Report: Cashing in on the New Mobile Commerce Paradigm Card News15. 25 (Dec 13, 2000): 1-3. Downloaded from ProQuestDirect on the Internet on Jun. 3, 2013, 3 pages.*
Cohn, Michael, Personal networks. Internet World7.12 (Jun. 15, 2001): 28-30+.downloaded from ProQuestDirect on Dec. 9, 2013, 5 pages.*

\* cited by examiner

*Primary Examiner* — James Zurita
(74) *Attorney, Agent, or Firm* — Kilpatrick Townsend & Stockton LLP

(57) ABSTRACT

A method of providing network access includes entering network access information into a merchant device at a merchant location. The information relates to a request from a customer to obtain network access. The method also includes causing the information to be transmitted to a host computer system from the merchant device, receiving a payment from the customer, receiving activation confirmation from the host computer system at the merchant device, and providing a presentation instrument to the customer. The presentation instrument may be used by the customer to obtain network access. The method further includes using the presentation instrument to settle a transaction with the customer for merchandise.

14 Claims, 4 Drawing Sheets

WIRELESS NETWORK ACCESS PREPAYMENT SYSTEMS AND METHODS

CROSS-REFERENCES TO RELATED APPLICATIONS

This application is a divisional of U.S. patent application Ser. No. 10/953,863, entitled "WIRELESS NETWORK ACCESS PREPAYMENT SYSTEMS AND METHODS", filed Sep. 28, 2004, which is related to, commonly assigned U.S. patent application Ser. No. 10/675,924, entitled "ACTIVATING TELEPHONE-BASED SERVICES USING A POS DEVICE," filed on Sep. 29, 2003 by Christopher R. McGee, the entire disclosures of which are herein incorporated for all purposes.

BACKGROUND OF THE INVENTION

Wireless network access is becoming increasingly common at merchant locations and public facilities. Many coffee shops, book stores, libraries, airports, and the like, provide wireless network access to their customers and/or facility users. Anyone with a laptop or hand held computer, personal digital assistant, or the like can have Internet access by completing a registration process that establishes communication between their device and the wireless network. Sometimes, however, the registration process may be intrusive.

Especially where access is not free, network users must provide extremely personal information to obtain access to such services. Many users are not comfortable providing credit card numbers, and the like to open networks. Others desire complete anonymity with respect to their activities on the Internet. Further, merchants desire to increase their customer loyalty and the profits they derive from providing services such as wireless network access to their customers. Thus, systems and methods are needed that improve the process by which customers access wireless networks at merchant locations and public facilities.

BRIEF SUMMARY OF THE INVENTION

Embodiments of the invention thus provide a method of providing network access. The method includes entering network access information into a merchant device at a merchant location. The information relates to a request from a customer to obtain network access. The method also includes causing the information to be transmitted to a host computer system from the merchant device, receiving a payment from the customer, receiving activation confirmation from the host computer system at the merchant device, and providing a presentation instrument to the customer. The presentation instrument may be used by the customer to obtain network access. The method further includes using the presentation instrument to settle a transaction with the customer for merchandise.

In some embodiments, the merchant location may be a retail store, restaurant, airport, library, fast food establishment, coffee shop, bank, mall, office building, sports arena, apartment complex, airplane, automobile, hotel, e-commerce site, health club, and/or the like. The merchant device may be a point-of-sale device, automated teller machine, kiosk, e-commerce server, vending machine, and/or the like. The network access may relate to a wireless network operated from within the merchant location. The wireless network may be a Wireless Fidelity (WiFi) network, WiMAX network, 802.11a network, 802.11g network, 802.16 network, 3G network. The merchant device may be a point-of-sale device having a reader. Entering network access information into a merchant device may include using the reader to obtain information from the presentation instrument. The reader may be a magnetic stripe reader, bar code reader, RFID reader, infrared reader, and/or the like. Receiving activation confirmation from the host computer system may include receiving an activation key code from the host computer system. The presentation instrument may be a card having a magnetic stripe, a card having a smart chip, a radio frequency emitting device, a virtual card, a "key chain" card, an infrared device, and/or the like. The presentation instrument may include a scratch-off, password-revealing area. Using the presentation instrument to settle a transaction with the customer for merchandise may include selling food or beverage to the customer.

In further embodiments, a system for providing network access includes a host computing system in communication with at least one merchant device. The host computing system is configured to receive a request from the merchant device to activate a network access presentation instrument for a customer, verify the validity of the presentation instrument, return an activation confirmation message to the merchant device, receive a request from a computing device of the customer to access a network, determine whether to allow the customer to access the network based on a network access account balance relating to the presentation instrument, and process a transaction for merchandise purchased by the customer using the presentation instrument. The network access may relate to a wireless network operated from within a merchant location.

In still further embodiments, the host computer system may be further configured to receive a request from the customer to convert loyalty value to network access value, increase the network access account balance, and decrease the loyalty account balance by a factor corresponding to an amount by which the network access account balance is increased.

In additional embodiments, a method of providing network access includes receiving a request from a merchant device to activate a network access presentation instrument for a customer, verifying the validity of the presentation instrument, returning an activation confirmation message to the merchant device, receiving a request from a computing device of the customer to access a network, determining whether to allow the customer to access the network based on an account balance relating to the presentation instrument, and processing a transaction for merchandise purchased by the customer using the presentation instrument. The method may include receiving a request from the customer to convert loyalty value to network access value, increasing the network access account balance, and decreasing the loyalty account balance by a factor corresponding to an amount by which the network access account balance is increased.

In other embodiments a method of providing wireless network access includes entering network access information into a merchant device at a merchant location. The information relates to a request from a customer to obtain network access to a wireless network. The method includes causing the information to be transmitted to a host computer system from the merchant device, receiving a payment from the customer, receiving activation confirmation from the host computer system at the merchant device, and providing a presentation instrument to the customer. The presentation instrument may be used by the customer to obtain network access. The method may include using the presentation instrument to settle a transaction for goods or services with the customer. The method may include receiving a request from the customer to add value to the presentation instrument, receiving payment from the customer for the additional value, and adding the value to the presentation instrument. The presentation instrument may be a virtual presentation instrument.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

According to embodiments of the invention, merchants and other network access providers provide customers with access to wireless networks through prepaid presentation instruments. Such presentation instruments include cards, fobs, mini-cards, "virtual" presentation instruments, and the like. In some embodiments, the presentation instrument includes an information encoding area, capable of being read by a reader, that may be used to activate the presentation instrument and/or to log on to wireless networks. In some embodiments, the presentation instrument also may be used for purchases from merchants. In some embodiments, use of the presentation instrument may be combined with customer loyalty programs. For example, if a customer purchases merchandise, food, beverages, and/or services from the merchant, the customer may qualify for free or reduced rate network access.

The present invention is not limited to obtaining network access from merchants. In some embodiments, public facilities, such as airports and libraries, provide network access using similar or identical systems and methods. Further, in some embodiments, many merchants may cooperate to offer integrated services to their customers. Further still, in some embodiments, a wireless network access service provider may provide such service through a number of merchant locations and/or public facilities. Those skilled in the art will appreciate additional embodiments and equivalents in light of the disclosure herein.

Figure 1:
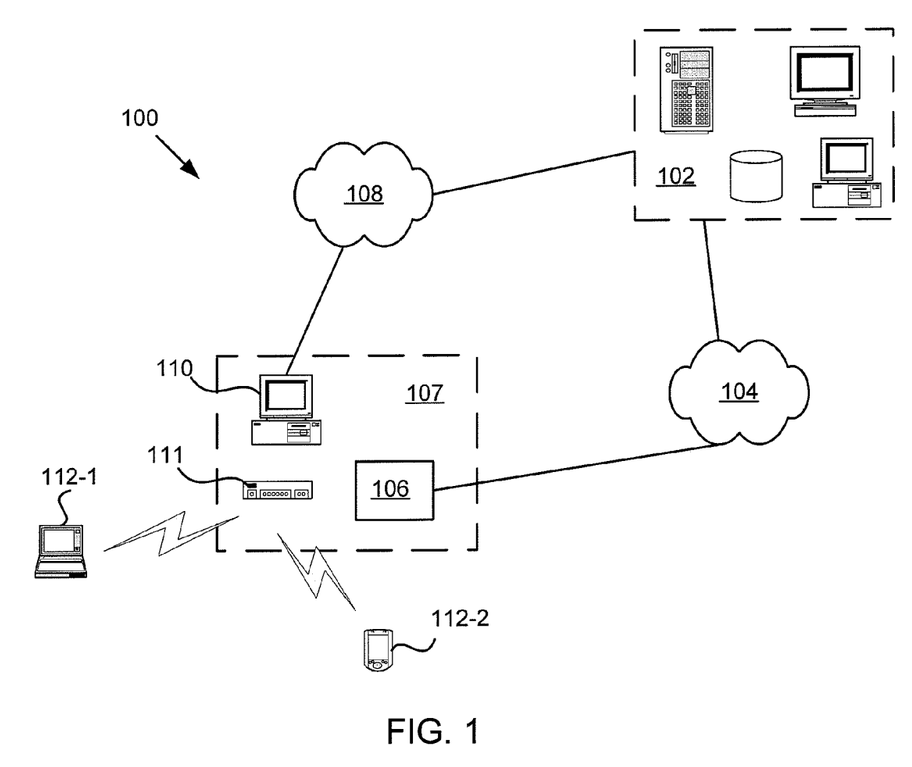
FIG. 1 illustrates a system for providing access according to embodiment of the invention.

Having described the present invention generally, attention is directed to FIG. 1, which illustrates one exemplary embodiment of a system 100 according to the present invention. As will be explained in more detail hereinafter, the system 100 may be used to provide prepaid wireless network access. It should be understood that the examples used herein relate to accessing packet-based networks such as the Internet. However, this is not a requirement. The teachings herein may be applied to accessing other types of networks, as is apparent to those skilled in the art in light of this disclosure.

The system 100 includes a host computer system 102. The host computer system 102 may include, for example, servers, personal computers, workstations, or other suitable computing devices. The host computer system 102 includes application software that programs the host computer system 102 to perform one or more functions according to the present invention. For example, application software resident on the host computer system 102 may program the host computer system 102 to receive and process prepaid wireless network access requests. In a specific embodiment, the host computer system 102 includes a loyalty program processor that tracks purchases made by customers and rewards them with points based on the purchases. The points may be redeemed for network access, among other things.

The host computer system 102 may include one or more of the aforementioned computing devices, as well as storage devices such as databases, disk drives, optical drives, and the like. The host computer system 102 may be fully located within a single facility or distributed geographically, in which case a network may be used to integrate the host computer system 102. Many other examples are possible and apparent to those skilled in the art in light of this disclosure. Thus, this example of a system 100 according to the present invention is not to be considered limiting.

The system 100 also includes a first communication network 104. The first network 104 may be the Internet, an intranet, a wide area network (WAN), a local area network (LAN), a virtual private network, and combination of the foregoing, or the like. The network 104 may include both wired and wireless connections, including optical links. In some embodiments, the network 104 is a transaction settlement network, such as a credit card transaction processing network. In some embodiments, pre-paid wireless network access presentation instruments are activated through the first network. Through the network 104, merchant devices 106 communicate with the host computer system 102.

The merchant devices 106, typically located at merchant locations 107, may be any device capable of reading information from wireless network access presentation instruments and transmitting the information through a communication link, such as the network 104, to a processing system, such as the host computer system 102. The information may be comprised by a request for activating the presentation instrument. In some embodiments, the merchant devices 106 comprise a reader, such as a mag stripe reader, a smart chip reader, a bar code reader, an infrared reader, an RFID reader, or the like, in combination with a computing device. In some embodiments, the merchant devices 106 comprise point-of-sale devices such as those more fully described in co-pending, commonly assigned U.S. patent application Ser. No. 10/116, 689, entitled "SYSTEMS AND METHODS FOR PERFORMING TRANSACTIONS AT A POINT-OF-SALE," filed Apr. 3, 2002, by Earney Stoutenburg, et al., which is a continuation-in-part of U.S. Pat. No. 6,547,132, entitled "POINT OF SALE PAYMENT SYSTEM," filed Aug. 9, 2000, by Randy J. Templeton, et al., which is a non-provisional of U.S. Prov. App. No. 60/147,899, entitled "INTEGRATED POINT OF SALE DEVICE," filed Aug. 9, 1999 by Randy Templeton, et al., the entire disclosures of which are herein incorporated by reference for all purposes. In still other embodiments, the merchant devices 106 comprise specially-designed computing and reading devices for activating prepaid wireless network access presentation instruments. Merchant devices also may comprise kiosks, automated teller machines, vending machines, and the like. In some embodiments, the merchant device is an e-commerce server that provides the merchant with a virtual storefront (e.g., e-commerce web site). Those skilled in the art will recognize equivalent devices in light of this disclosure.

The merchant devices 106 may be located at any of a wide variety of merchant locations 107. By way of example and not limitation, "merchant locations" will be understood to include retail stores (e.g., book stores and the like), food and beverage vendors (e.g., coffee shops, fast food establishments, restaurants, and the like), public facilities (e.g., airports, libraries, office building, sports arenas, apartment complexes, hotels, airplanes, automobiles, cruise ships, malls, parks, and the like), and service providers (e.g., banks, health clubs, doctors' offices, and the like), among others. A "merchant location" also may be a web site or other virtual location.

The system 100 also includes a second network 108, which may be any of the aforementioned networks. The first network 104 and the second network 108 may be the same network, different networks, or portions of a larger network. The second network 108 provides a connection between the host computer system 102 and computing devices 109 at merchant locations 107. In a specific embodiment, the second network is a packet-based data network, such as the Internet. Wireless hubs 111 at merchant locations 107, allow customer computing devices 112 to access the second network 108. As those skilled in the art will appreciate the wireless hubs 111 may use and of a variety of wireless protocols, including 802.11b, 802.11a, 802.11g, 802.16, third generation 3G, or other appropriate communications protocol, which may be known by other common names such as Wireless Fidelity (WiFi), WiMAX, 3G, and the like.

The customer computing devices 112 may be, for example, laptop computers 112-1 or handheld computers 112-2. Many other examples are possible. The devices 112 may be equipped with network access cards that allow them to communicate with the network via the hub 111.

Figure 2:
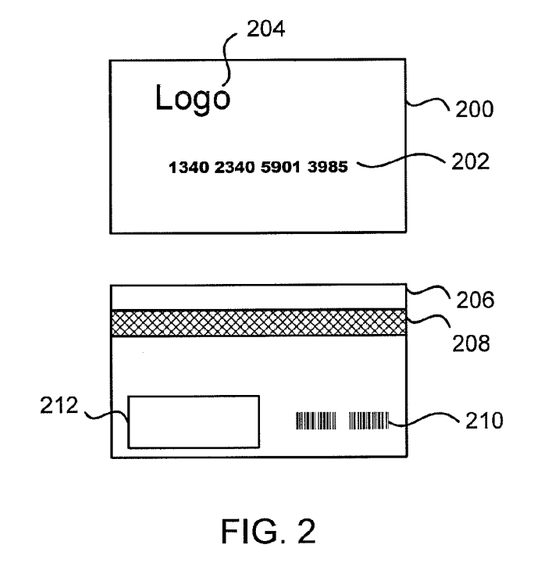
FIG. 2 illustrates an exemplary presentation instrument that may be used to access a network according to embodiments of the invention.

Attention is directed to FIG. 2, which illustrates an embodiment of prepaid wireless network access presentation instrument 200 according to an embodiment of the invention. It is to be understood that this embodiment of a presentation instrument is merely exemplary, and many other examples are possible. For example, a network access presentation instrument may be merely a number, and possibly a password and/or personal identification number, provided to a customer by a merchant. The number may be listed on a receipt or relayed verbally, for example. Other presentation instruments include RF fobs, "key chain" cards, and the like. In this specific embodiment, the presentation instrument 200 comprises what is commonly recognized as a "gift card" that is displayed at merchant locations attached to a card carrier. A customer desiring to obtain the service enabled by the presentation instrument 200 takes it to a cashier for payment and activation as will be described in more detail below.

The presentation instrument 200 may be embossed with an access number 202 and, in some embodiments, a logo 204, or brand. A back side 206 of the presentation instrument may include one or more information encoding regions, for example, a magnetic stripe 208 and/or a bar code 210. The information encoding regions may be read by a point-of-sale device (e.g., the merchant device 106 described above with respect to FIG. 1) and/or a reader associated with a customer computing device. In some embodiments, the presentation instrument includes a password area 212. The password may be a scratch-off region that does not reveal the password while the presentation instrument 200 is displayed for purchase.

Figure 3:
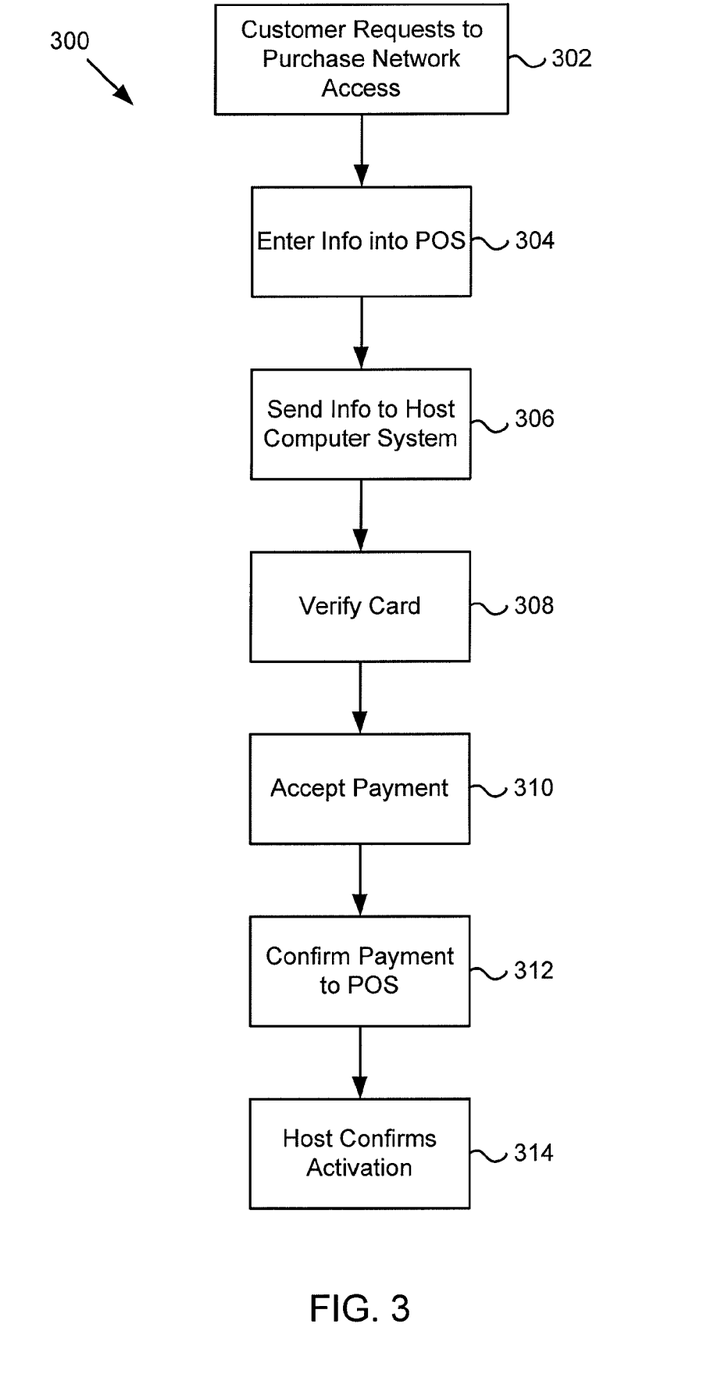
FIG. 3 illustrates a method of activating a network access presentation instrument according to embodiments of the invention.

Attention is directed to FIG. 3, which illustrates a first method 300 of activating a prepaid wireless network access presentation instrument ("access card" or "card" for convenience) according to an embodiment of the invention. At block 302, a customer presents an access card to a merchant for purchase and activation. The card may be any type of instrument that represents the service to be provided. For example, the card may be a stored value card, a radio frequency identification (RFID) card, a smart chip card, a bar-coded card, and the like. The card may be used to access a specific wireless network or may be used to access several different networks.

In one embodiment, the "card" comprises a receipt that the customer receives at the conclusion of the transaction. The receipt has access information that the customer then may use to obtain network access. In some embodiments, the customer may be given the access information verbally or electronically, in which case no physical medium is involved. Thus, in some examples, presenting an access card to a merchant for purchase and activation comprises simply requesting such a transaction from the merchant without physically presenting anything to the merchant.

In another embodiment, presenting an access card to a merchant for purchase and activation comprises making a selection from an ecommerce merchant (e.g., placing the selection in an electronic shopping cart) and "checking out" via any of a number of well known systems for doing such. In yet another example, presenting an access card to a merchant for purchase and activation comprises requesting network access via a telephone operator or TRU. In another embodiment, presenting an access card to a merchant for purchase and activation comprises requesting a presentation instrument from an automated teller machine or kiosk. Other examples are possible.

At block 304, the merchant enters transaction information relating to the service requested by the customer into a POS. The transaction information may include an access number, which may be any number that uniquely identifies the service to be provided to this specific customer. The access number may be a unique number on a physical card (see, e.g., access number 202 of FIG. 2) that the customer presents to the merchant. In other embodiments, the transaction information comprises a product SKU# that represents the service the customer is requesting. This example will be described more fully immediately below.

In this specific example, a customer requests 40 hours of wireless network access from an attendant at a coffee shop. The attendant looks in a SKU# book and finds a listing of several services or promotions available for purchase by customers. In the "wireless network access" section, the attendant selects "40 hours" from a list of levels of access. Other levels may include, for example, 90 days, 12 years, 50 megabytes, and the like, each of which service or promotion may have a unique SKU#. The attendant then enters the unique SKU# for 40 hours of wireless network access into the POS. In other examples, the SKU# may represent the service (e.g., wireless network access) in which case, the POS may prompt the attendant to enter the level of service by selecting from a menu. Many other variations on this example are possible.

The information may be entered into the POS in any of a number of ways. If the "card" is a physical object, then the card may be interfaced to the POS in any of a number of ways. The card may be "swiped" through a reader, a bar code on the card may be scanned, the card may be placed in the vicinity of an RFID reader an infrared reader, and the like. In one embodiment, the merchant may use a bar code reader to scan a SKU# in a SKU# book such as in the specific example described in detail above.

In some embodiments, the transaction information entered by the merchant also includes payment information. For example, if a customer is purchasing a gift card for accessing a wireless network and is paying using a credit card, then the transaction may comprise first swiping the gift card, then swiping the customer's credit card. Those skilled in the art will recognize many variations on this example in light of the teachings herein.

Once the transaction information is entered into the POS, the POS sends the transaction information to a host computer system at block 306. If the transaction information contained a unique access number, then the host confirms the validity of the number. If the transaction information contained only a generic SKU#, then the host computer system may generate a unique access number for the customer. This may include both an access number and a key number (e.g., password) to be used by the customer in combination with the access number to obtain the service.

If the transaction information included a number requiring validation, the host computer returns verification of validity at block 308. At block 310, the merchant accepts payment for the service, then confirms to the POS that the payment was received at block 312. At block 314, the host computer confirms activation of the card and stores data that indicates the card as being active.

As stated previously, block 304, 306, 308, 312, and 314 may be reduced to a two-step process wherein the merchant swipes a card and identifies that the customer has tendered payment (e.g., in cash). Thereafter, the host computer returns confirmation of activation. Many other such examples are possible.

In some embodiments, confirming activation of the card may comprise sending a unique access number and password to the POS. The POS then may be used to print a receipt with the access information. In other embodiments, the POS may print an access card. The access card may be any of the previously mentioned access cards. In some embodiments, the activation process is completed in real time or near real time, thus allowing the customer to instantly access the service. In some embodiments, activation in real time means instantly (e.g., within about 5 seconds), near instantly, and/or with no pre-programmed or intentional delays.

If the customer is acquiring prepaid network access through an ecommerce merchant, catalog mail order operator, TRU, or the like, then the access information may be provided in any of a number of ways. In some examples, the merchant mails a physical card to the customer. In other embodiments, an operator or TRU provides the access information to the customer verbally. In still other embodiments, the access information is displayed on the customer's computer screen. Other examples are possible, and one does not necessarily preempt the other. For example, if the customer orders a card on line (e.g., via the Internet or World Wide Web), the access information may be displayed for the customer while the card is mailed.

Figure 4:
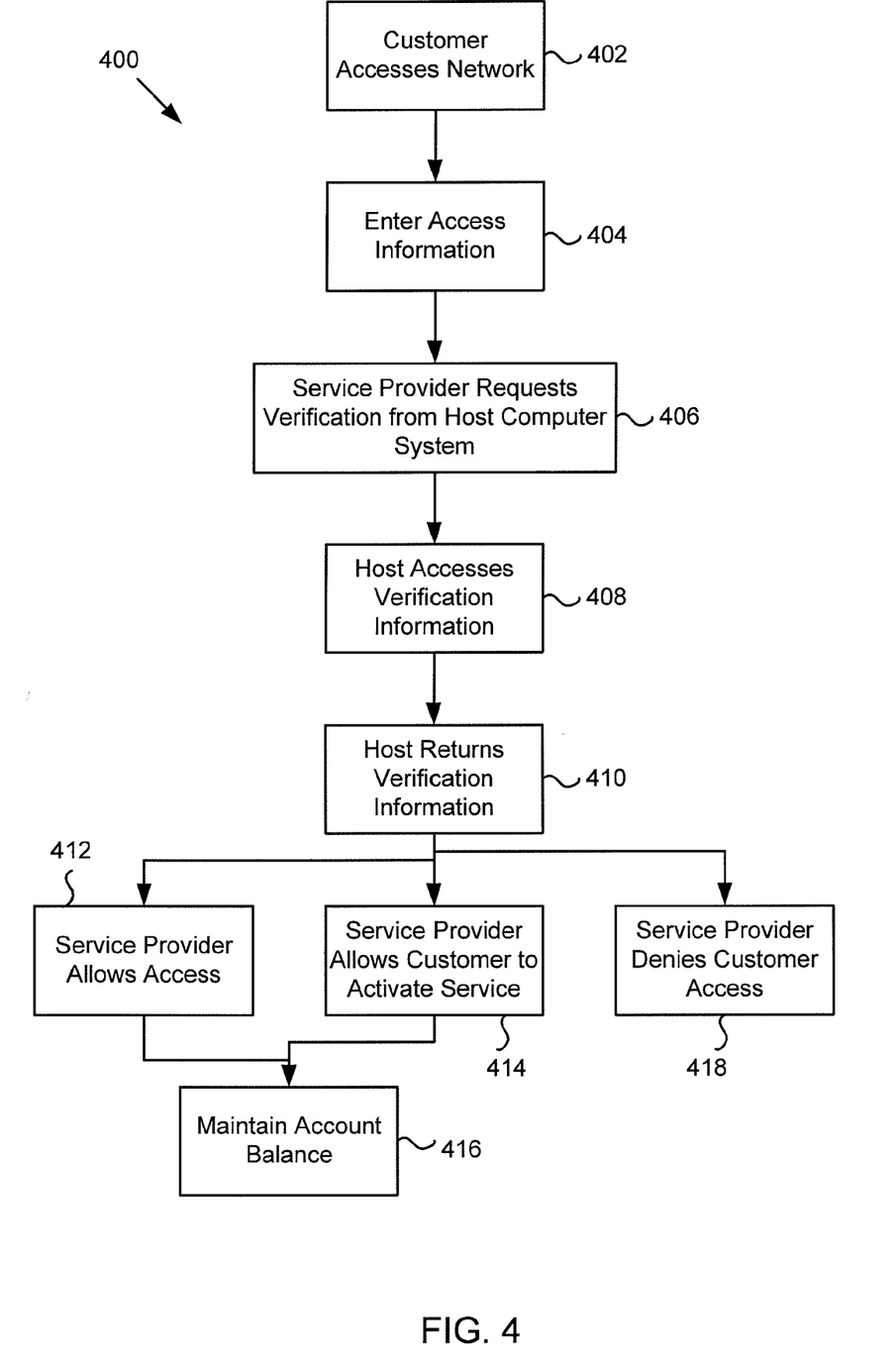
FIG. 4 illustrates a method of providing network access according to embodiments of the invention.
Figure 5:
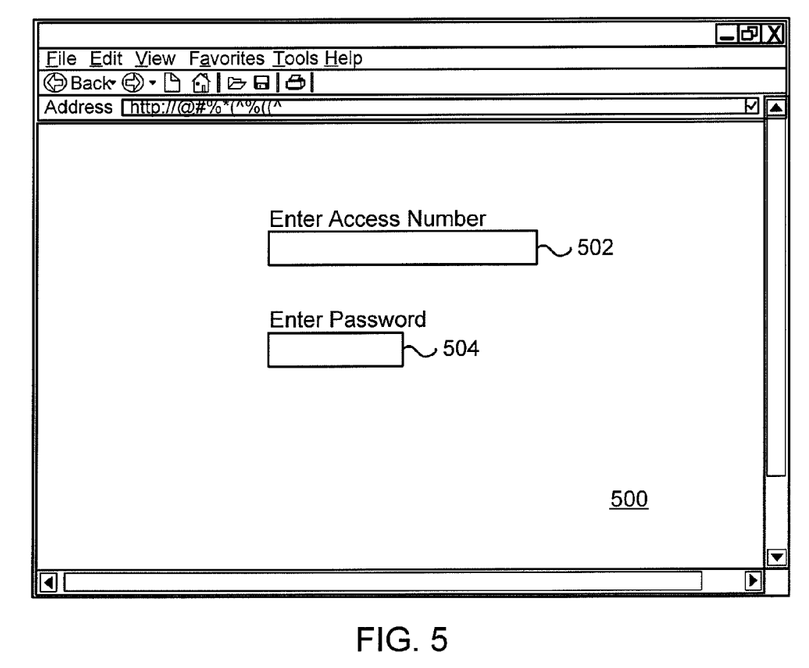
FIG. 5 illustrates an exemplary network access display screen.
Figure 6:
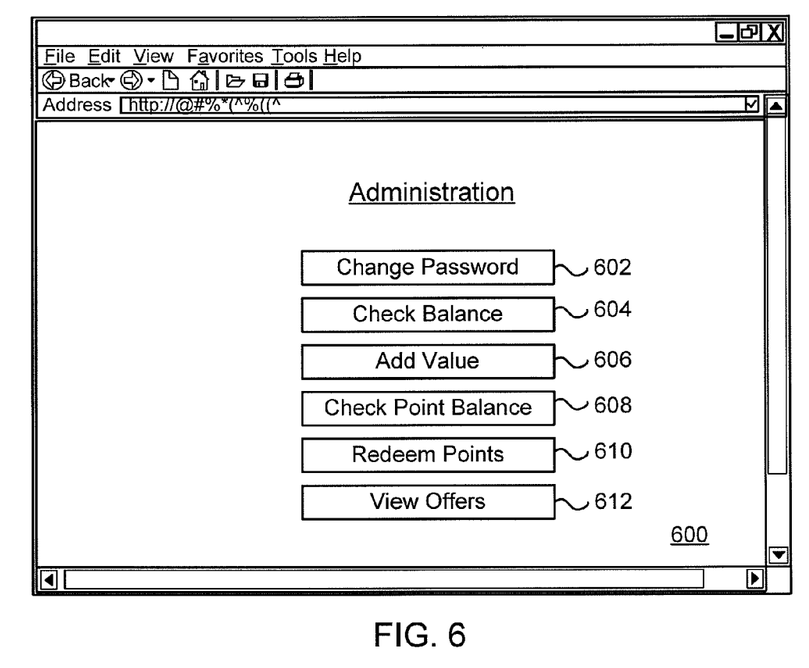
FIG. 6 illustrates an exemplary account maintenance display screen.

Having described a method of activating a prepaid wireless network access card, attention is directed to FIG. 4 in combination with FIGS. 5 and 6, which illustrate a method 400 of using a card to access a wireless network and exemplary display screens that may be used to enter necessary information and administer an account. At block 402, the customer requests access to the network using a computing device, such as a laptop computer, PDA, or the like. In a specific embodiment, this comprises using a wireless network access card of the computing device to detect a wireless network at a merchant location. In doing so, the customer may open a web browser on the computing device and have limited access to a service provider (e.g., an ISP). The service provider causes the network access display screen 500 of FIG. 5 to be displayed on the customer's computing device. The display screen serves as a gateway for the customer to the network.

At block 404, the customer enters access information. In some embodiments, this comprises entering information via a keypad into data areas on the display screen 500. For example, the customer may enter the access number 202 from the presentation instrument into the access number data field 502 and a key code (e.g., password) into the password data field 504. In other embodiments, this comprises using a reader (e.g., a magnetic stripe reader) to read information from a presentation instrument. In other examples, this comprises doing a combination of things such as reading information from the card followed by keying in additional access information, such as via a keypad. Other examples are possible.

At block 406, the service provider transmits the network access information to a host computer system 102. The network access information may comprise the unique identifier given to the customer, the access number on the card, and the like. The network access information also may include the customer's password, if used.

At block 408, the host computer system accesses its stored information to determine if the network access information is valid. The host computer system responds to the service provider at block 410. If the information is valid, the service provider allows the customer to access the network at block 412. If not, the service provider may allow the customer to obtain access at block 414 in previously-known ways. Otherwise, the service provider may simply deny the customer access at block 418.

Thereafter, the service provider and host computer system may cooperate to keep track of the customer's balance. This may be accomplished in a number of ways. For example, the customer may have purchased a finite number of megabytes of access, a finite number of minutes, and/or a finite access period. In either case, the service provider may send information to the host computer system that allows the host computer system to appropriately adjust the customer's balance. The host computer system then may use this information in the future to determine whether the customer should be given access to the network. Keeping track of the customer's declining balance is reflected as block 416 in FIG. 2.

Maintaining the customer's balance at block 216 may include keeping track of the customer's purchases using the presentation instrument. For example, if the customer makes purchases at the merchant location using the presentation instrument, the host computer system may credit the customer with loyalty points. Thereafter, the customer may redeem the points for other items, include additional network access.

In a specific embodiment relating to using a presentation instrument at a merchant location, the customer swipes the presentation instrument through a reader at the merchant location (or otherwise interfaces the presentation instrument with a reader or enters virtual presentation instrument into a reader) to initiate a session. The customer then accesses the network for a desired length of time. At the conclusion of the desired length of time, the customer ends the session by swiping the card. The host computer system or the merchant device calculates the session time and appropriately adjusts the customer's balance.

FIG. 6 illustrates an account maintenance display screen 600. The display screen 600 includes a number of buttons for accomplishing various functions. For example, using the display screen 600, the customer may change his password 602, check his network access account balance 604, add value to his presentation instrument 606, check his loyalty point balance 608, redeem points for network access or other items 610, and view offers from the merchant or service provider 612. Those skilled in the art will appreciate that this is but one example of how accounts may be administered in accordance with embodiments of the invention. For example, a customer may call an interactive voice response unit (IVR) or telephone response unit (TRU) to accomplish any or all of the aforementioned account maintenance functions.

Having described several embodiments, it will be recognized by those of skill in the art that various modifications, alternative constructions, and equivalents may be used without departing from the spirit of the invention. For example, those skilled in the art will realize that the teachings herein are not limited to wireless, packet-based networks. Additionally, a number of well known processes and elements have not been described in order to avoid unnecessarily obscuring the present invention. For example, those skilled in the art know how to arrange computing devices into a network and configure communication among them. Accordingly, the above description should not be taken as limiting the scope of the invention, which is defined in the following claims.

What is claimed is:

1. A method of providing network access, the method comprising:
    entering, at a host computer system, network access information into a merchant device at a merchant location, the information relating to a request from a customer to obtain network access, wherein the network access comprises providing access by a device of the customer to an access point which provides the device with Internet access;
    causing, by the host computer system, the information to be transmitted to a host computer system from the merchant device;
    receiving, at the host computer system, a payment from the customer for the network access to the access point;
    receiving, at the host computer system, activation confirmation from the host computer system at the merchant device;
    in response to receiving the activation confirmation, providing, by the host computer system, a presentation instrument to the customer, wherein the presentation instrument is used by the customer to obtain the network access for the device of the customer, wherein the presentation instrument is funded by the payment from the customer; and
    using, at the host computer system, the presentation instrument by the customer to obtain the network access to the access point and connect to the Internet, wherein the presentation instrument funding is used to fund the network access.

2. The method of claim 1, wherein the merchant location comprises a selection from the group consisting of retail store, restaurant, airport, library, fast food establishment, coffee shop, bank, mall, office building, sports arena, apartment complex, airplane, automobile, hotel, e-commerce site, and health club.

3. The method of claim 1, wherein the merchant device comprises a selection from the group consisting of point-of-sale device, automated teller machine, kiosk, e-commerce server, and vending machine.

4. The method of claim 1, wherein the network access relates to a wireless network operated from within the merchant location.

5. The method of claim 4, wherein the wireless network comprises a selection from the group consisting of Wireless Fidelity (WiFi) network, WiMAX network, 802.11 a network, 802.11 g network, 802.16 network, and 3G network.

6. The method of claim 1, wherein the merchant device comprises a point-of-sale device having a reader.

7. The method of claim 6, wherein entering network access information into a merchant device comprises using the reader to obtain information from the presentation instrument.

8. The method of claim 6, wherein the reader comprises a selection from the group consisting of magnetic stripe reader, bar code reader, RFID reader, and infrared reader.

9. The method of claim 1, wherein receiving activation confirmation from the host computer system comprises receiving an activation key code from the host computer system.

10. The method of claim 1, wherein the presentation instrument comprises a selection from the group consisting of a card having a magnetic stripe, a card having a smart chip, a radio frequency emitting device, a virtual card, a "key chain" card, and an infrared device.

11. The method of claim 1, wherein the presentation instrument comprises a scratch-off, password-revealing area.

12. The method of claim 1, wherein using the presentation instrument to settle a transaction with the customer for merchandise comprises selling food or beverage to the customer.

13. A system for providing network access, the system comprising:
    a computer processor; and
    a memory device in communication with the computer processor having sets of instructions stored thereon which, when executed by the computer processor, cause the computer processor to:
        enter network access information into a merchant device at a merchant location, the information relating to a request from a customer to obtain network access, wherein the network access comprises providing access by a device of the customer to an access point which provides the device with Internet access;
        cause the information to be transmitted to a host computer system from the merchant device;
        receive a payment from the customer for the network access to the access point;
        receive activation confirmation from the host computer system at the merchant device;
        in response to receiving the activation confirmation, provide a presentation instrument to the customer, wherein the presentation instrument is used by the customer to obtain the network access for the device of the customer, wherein the presentation instrument is funded by the payment from the customer; and
        use the presentation instrument by the customer to obtain the network access to the access point and connect to the Internet, wherein the presentation instrument funding is used to fund the network access.

14. A non-transitory computer-readable medium for providing network access having sets of instructions stored thereon which, when executed by a computer, cause the computer to:
    enter network access information into a merchant device at a merchant location, the information relating to a request from a customer to obtain network access, wherein the network access comprises providing access by a device of the customer to an access point which provides the device with Internet access;

cause the information to be transmitted to a host computer system from the merchant device;

receive a payment from the customer for the network access to the access point;

receive activation confirmation from the host computer system at the merchant device;

in response to receiving the activation confirmation, provide a presentation instrument to the customer, wherein the presentation instrument is used by the customer to obtain the network access for the device of the customer, wherein the presentation instrument is funded by the payment from the customer; and use the presentation instrument by the customer to obtain the network access to the access point and connect to the Internet, wherein the presentation instrument funding is used to fund the network access.

\* \* \* \* \*